(12) United States Patent
Moran (10) Patent No.: US 12,097,820 B1
(45) Date of Patent: Sep. 24, 2024

(54) AIRBAG WITH EXTENDABLE MEMBER

(71) Applicant: ZF Passive Safety Systems US Inc., Washington, MI (US)

(72) Inventor: Dylan Moran, Rochester Hills, MI (US)

(73) Assignee: ZF Passive Safety Systems US Inc., Washington, MI (US)

( * ) Notice: Subject to any disclaimer, the term of this patent is extended or adjusted under 35 U.S.C. 154(b) by 0 days.

(21) Appl. No.: 18/345,241

(22) Filed: Jun. 30, 2023

(51) Int. Cl.
*B60R 21/232* (2011.01)
*B60R 21/0136* (2006.01)
*B60R 21/213* (2011.01)
*B60R 21/2165* (2011.01)
*B60R 21/2342* (2011.01)
*B60R 21/235* (2006.01)
*B60R 21/237* (2006.01)
*B60R 21/231* (2011.01)

(52) U.S. Cl.
CPC ........ *B60R 21/232* (2013.01); *B60R 21/0136* (2013.01); *B60R 21/213* (2013.01); *B60R 21/2165* (2013.01); *B60R 21/2342* (2013.01); *B60R 21/235* (2013.01); *B60R 21/237* (2013.01); *B60R 2021/23169* (2013.01); *B60R 2021/23509* (2013.01); *B60R 2021/23542* (2013.01)

(58) Field of Classification Search
CPC ............................. B60R 21/213; B60R 21/232
See application file for complete search history.

(56) References Cited

U.S. PATENT DOCUMENTS

| | | | | |
|---|---|---|---|---|
| 11,173,864 | B2 * | 11/2021 | Moran | B60R 21/232 |
| 2011/0042923 | A1 * | 2/2011 | Hatfield | B60R 21/213 |
| | | | | 280/730.2 |
| 2015/0191141 | A1 * | 7/2015 | Wang | B60R 21/216 |
| | | | | 280/730.2 |
| 2021/0114545 | A1 * | 4/2021 | Moran | B60R 21/232 |

FOREIGN PATENT DOCUMENTS

| | | | | |
|---|---|---|---|---|
| CN | 212604972 U | * | 2/2021 | ............. B60R 21/20 |
| DE | 102010020444 A1 | * | 11/2011 | ............ B60R 21/201 |
| DE | 102016120177 A1 | * | 4/2018 | ............ B60R 21/201 |
| WO | WO-2010066371 A1 | * | 6/2010 | ............ B60R 21/213 |

* cited by examiner

*Primary Examiner* — Nicole T Verley
(74) *Attorney, Agent, or Firm* — Tarolli, Sundheim, Covell & Tummino LLP (57) ABSTRACT

An apparatus for helping to protect an occupant of a vehicle includes an airbag inflatable from a stored condition to a deployed condition in which the airbag is positioned to help protect the vehicle occupant. The airbag includes an extendable member comprising one or more slits formed in the airbag material. Each slit has a concave configuration defining an extendable portion of the extendable member that is movable relative to the remainder of the extendable member to extend the reach of the extendable member. According to one aspect, the extendable member can form a mounting tab for mounting the airbag in the vehicle. According to another aspect, the extendable member can form a wrapping structure for maintaining the airbag in a packaged condition for installation in the vehicle.

26 Claims, 7 Drawing Sheets

AIRBAG WITH EXTENDABLE MEMBER

FIELD OF THE INVENTION

The invention relates to an apparatus for helping to protect an occupant of a vehicle. More particularly, the invention relates to an airbag and airbag structures with extendable members that facilitate packaging and mounting the airbag in the vehicle.

BACKGROUND OF THE INVENTION

It is known to inflate an inflatable vehicle occupant protection device to help protect a vehicle occupant in the event of a vehicle collision. One particular type of inflatable vehicle occupant protection device is an curtain airbag that is fixed to the roof of the vehicle and/or to a support structure adjacent to the roof of the vehicle. The curtain airbag is configured to inflate from the roof of the vehicle downward inside the passenger compartment in the event of a side impact or a vehicle rollover. The curtain airbag, when inflated, is positioned between a vehicle occupant and the side structure of the vehicle. Other types of airbags include frontal airbags mounted in a steering wheel or instrument panel, side airbags mounted in a vehicle seat, door, or pillar, and knee airbags mounted in structure adjacent or near a footwell of the vehicle.

Airbags are typically placed in the stored condition by rolling and/or folding to place the airbag in a packaged condition, ready for installation in the vehicle. The "packaged condition" refers to the airbag in its ready-to-install condition, regardless of whether it is rolled, folded, or a combination of rolled and folded. In the packaged condition, the airbag can also include additional features and/or structures, such as tape, packaging sleeves, and/or wraps, installation and/or fastening structures (fasteners, clamps, brackets, etc.), and inflation components, such as inflators, fill tubes, diffusers, etc.

The airbag is installed in the vehicle as a unit, referred to as an airbag module. The airbag module includes the packaged airbag and inflator, and can also include additional components, such as housings, fill tubes, inflator clamps, mounting hardware, wiring harnesses, etc. Some airbags, especially curtain airbags, can include mounting tabs, located along the upper edge of the curtain airbag, that receive mounting hardware, e.g., fasteners, clamps, etc., that connect the curtain airbag, and the curtain airbag module, to the vehicle.

SUMMARY OF THE INVENTION

An apparatus for helping to protect an occupant of a vehicle includes an airbag having a packaged condition in which the airbag is deflated and rolled/folded for installation in the vehicle. The airbag includes extendable members that allow for folding the airbag fabric to extend a portion of the airbag beyond the dimensions of the airbag. The extendable members are formed from portions of the airbag fabric defined by one or more slits or openings. The slits/openings allow the portions to be folded relative to the surrounding airbag material so that the members can be extended.

The extendable members can serve a variety of functions. For example, the extendable members can form straps that maintain the airbag in a packaged condition. As another example, the extendable members can form mounting tabs with extended reach so that the airbag can be mounted to a vehicle architecture that necessitates an extended reach. As a further example, the extendable members can be used to extend the radial reach of a mounting tab around an inflator or other component of the airbag module.

Advantageously, the extendable members extend the reach of the member beyond the periphery of the airbag. This allows the airbag to be produced in nested patterns that maximize manufacturing efficiency, as it relates to the amount of material used to construct the airbag and the amount of material that goes to waste in doing so.

An apparatus for helping to protect an occupant of a vehicle, includes an airbag inflatable from a stored condition to a deployed condition in which the airbag is positioned to help protect the vehicle occupant. The airbag includes an extendable member comprising one or more slits formed in the airbag material. Each slit has a concave configuration defining an extendable portion of the extendable member that is movable relative to the remainder of the extendable member to extend the reach of the extendable member.

According to one aspect, the extendable member can be formed along a periphery of the airbag. The extendable member can be configured so that the extendable portion extends beyond the periphery of the airbag.

According to another aspect, the airbag can have a one-piece woven fabric construction comprising overlying panels that are interwoven to form single layer portions defining an inflatable volume between the overlying panels. The periphery can include a single layer portion of the one-piece woven fabric. The one or more slits can extend through the single layer portion.

According to another aspect, the extendable member can include a plurality of nested concave slits defining a plurality of nested extendable portions. Each extendable portion can be is movable relative to an adjacent portion in which it is nested. Each extendable portion, when extended, can be configured to increase the reach of the extendable member.

According to another aspect, the concave shapes of adjacent ones of the nested slits can be inverted relative to each other.

According to another aspect, the extendable portions can be configured to be folded away from the remainder of the extendable member to extend the reach of the extendable member.

According to another aspect, the extendable member can include a wrapping structure configured to extend around the airbag to maintain the airbag in a packaged condition.

According to another aspect, the wrapping structure can include a retention tip. The retention tip can be configured to extend through a retention opening formed in the airbag material to retain the wrapping structure wrapped around the airbag.

According to another aspect, the retention tip can include retention slots configured to receive portions of the airbag material along the periphery of the retention opening to retain the wrapping structure wrapped around the airbag.

According to another aspect, the retention opening can be formed in a tab defined by the first slit.

According to another aspect, the retention tip can be configured to release in response to airbag deployment.

According to another aspect, the wrapping structure can include a tear seam.

According to another aspect, the airbag can be a curtain airbag having a packaged condition configured for installation at or near the intersection of a roof and side structure of the vehicle. The wrapping structure can extend around and maintain the curtain airbag in the packaged condition.

According to another aspect, the extendable member can include a mounting tab for mounting the airbag in the vehicle.

According to another aspect, the extendable portion can include a mounting aperture for receiving a fastening structure for securing the airbag to the vehicle. The extendable portion can be configured extend the reach of the mounting tab.

According to another aspect, the mounting tab can be formed along a periphery of the airbag. The extendable portion of the extendable member can be configured to extend the position of the mounting aperture beyond the periphery of the airbag.

According to another aspect, the mounting tab can be formed along a periphery of the airbag that defines an inflatable volume of the airbag. The extendable portion of the extendable member can be configured to extend the position of the mounting aperture to overlie the inflatable volume.

According to another aspect, the slits can include a first slit having a generally U-shaped configuration that defines a first extendable portion. The first extendable portion can be movable to extend the reach of the extendable member by folding the first extendable portion along a fold line that extends between ends of the first slit.

According to another aspect, the slits can include a second slit having a generally U-shaped configuration. The second slit can be nested within and inverted relative to the first slit. The second slit can define a second extendable portion nested within the first extendable portion. The second extendable portion can be movable to extend the first extendable portion to thereby extend the reach of the extendable member by folding the second extendable portion along a fold line that extends between ends of the second slit.

According to another aspect, the extendable member can include a mounting tab for mounting the airbag in the vehicle. The second extendable portion can include an aperture for receiving a structure for mounting the airbag in the vehicle.

According to another aspect, the extendable member can include a wrapping structure for maintaining the airbag in a packaged condition. The slits can include a third slit having a shape that forms a retention tip of the wrapping structure. The third slit can include portions that define retention slits adjacent the retention tip. The retention tip can include a third extendable portion nested within the second extendable portion. The retention tip can be movable to extend the first extendable portion to thereby extend the reach of the extendable member by folding the retention tip along a fold line that extends between the retention slits.

According to another aspect, an airbag module can include the airbag and an inflator configured to inflate the airbag.

According to another aspect, a vehicle safety system can include the airbag module and a controller configured to actuate the inflator in response to detecting the occurrence of a vehicle collision based on signals received from one or more sensors.

According to another aspect, the airbag can have multiple components that are interconnected to form the airbag structure. The extendable member can form one of the components and can be connected to the periphery of the airbag.

According to another aspect, the airbag can be a side airbag or a knee airbag. The extendable member can be configured extend the reach of a mounting tab of the airbag so that a remotely located mounting member can be reached.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION

Figure 1A:
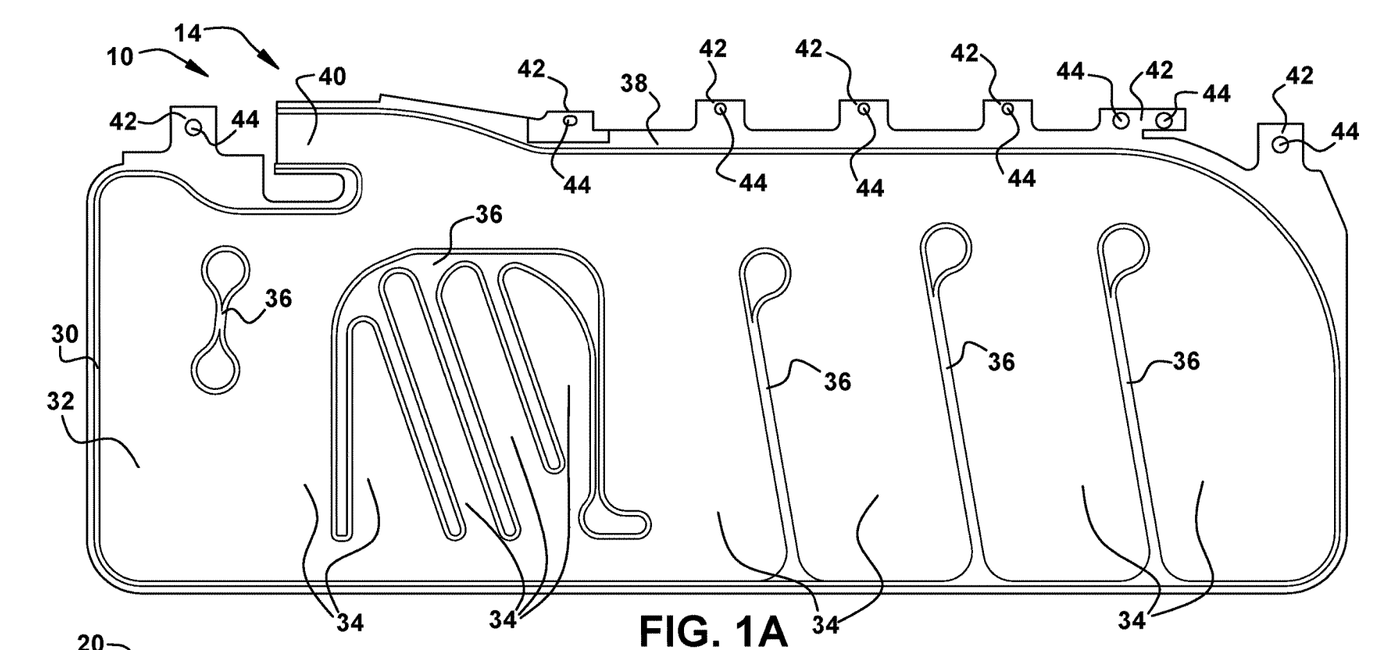
FIG. 1A is a plan view of a curtain airbag, according to one example configuration.
Figure 1B:
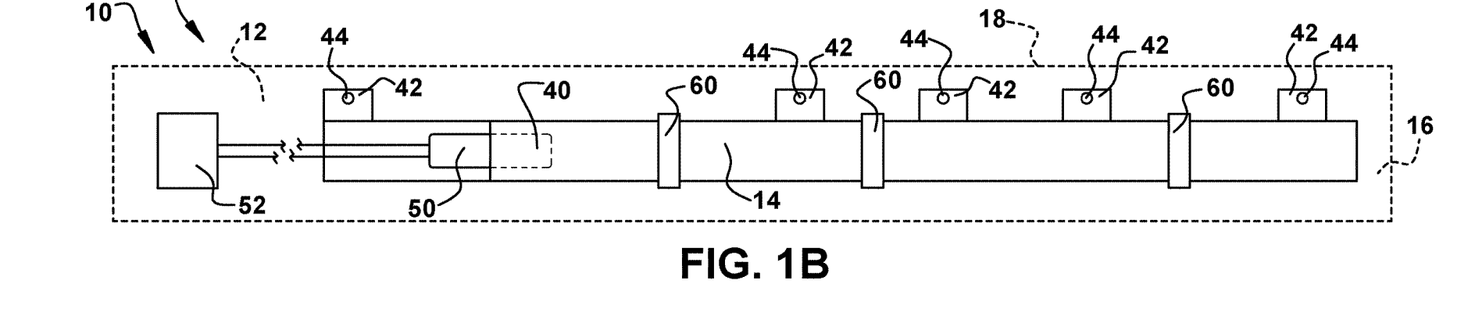
FIG. 1B is a schematic view of the curtain airbag of FIG. 1A in a packaged condition for installation in a vehicle as a component of a vehicle safety system.

Referring to FIGS. 1A and 1B, a vehicle safety system 10 includes an airbag module 20 for helping to protect an occupant of a vehicle 12. The airbag module 20 includes an inflatable vehicle occupant protection device 14 in the form of an airbag. The airbag 14 of FIGS. 1A and 1B is a curtain airbag. The novel and advantageous features disclosed herein are not, however, limited to curtain airbags. The novel and advantageous features disclosed herein can be applied to other types of airbags including, but not limited to, frontal airbags, side airbags, and knee airbags or knee bolsters.

The airbag 14 can be constructed of any suitable material, such as nylon (e.g., woven nylon 6-6 yarns), and can be constructed in any suitable manner. For example, the airbag 14 can have a one-piece woven (OPW) construction in which the airbag is woven as a single piece of material. As another example, the airbag 14 can include overlying panels and other cut components that are interconnected by known means, such as stitching, ultrasonic welding, heat bonding, or adhesives, to form the airbag 14. The airbag 14 can be uncoated, coated with a material, such as a gas impermeable urethane, or laminated with a material, such as a gas impermeable film. The airbag 14 thus can have a gas-tight or substantially gas-tight construction. Those skilled in the art will appreciate that alternative materials, such as polyester yarn, and alternatives coatings, such as silicone, can also be used to construct the airbag 14.

The airbag 14 of FIG. 1A is just one of various example configurations that can be implemented in the vehicle safety system 10. Airbag configurations can vary greatly from vehicle to vehicle depending on a variety of factors, such as the architecture of the vehicle and the desired degree or extent of airbag coverage. The airbag 14 of FIG. 1A does include several features typical of most, if not all, airbags. A peripheral connection 30 defines an inflatable volume 32 of the airbag, which is divided into inflatable chambers 34 by interior connections 36 within the peripheral connection. An inflator mouth 40 is configured to receive an inflator 50 (see FIG. 1B) so that inflation fluid can be directed from the inflator into the inflatable volume 32.

A series of mounting tabs 42, each of which can include one or more mounting apertures 44, are spaced along an upper edge 38 of the airbag 14 and facilitate connecting the airbag and the airbag module 20 to the vehicle 12. Typically, the airbag module is connected to the vehicle at or near the intersection of a side structure 16 of the vehicle and the vehicle roof 18, above the vehicle doors and side windows (not shown). The airbag module 20 can, for example, be mounted to a roof rail of the vehicle 12. When inflated, the airbag 14 is positioned between the side structure 16 and the vehicle occupants, and extends along the length of the vehicle 12.

In the installed condition of FIG. 1B, the airbag module 20 includes the airbag 14 in a packaged condition, along with the inflator 50, which is secured in the inflator mouth 40 in a known manner, such as a via a clamp (not shown). The inflator 50 can be of any known type, such as stored gas, solid propellant, augmented, or hybrid. The inflator 50 is operatively connected to an airbag controller 52 configured to actuate the inflator in response to sensing the occurrence of an event for which occupant protection is desired, such as a collision or rollover event.

The airbag module 20 includes the airbag 14 in a deflated, flattened, and rolled and/or folded condition. This can be done, for example, by rolling and/or folding a lower edge of the airbag 14 (as viewed in FIG. 1A) upward toward an upper edge of the airbag. This places the airbag 14 the packaged condition, with the airbag module 20 being ready for installation. By "package" or "packaged," it is meant that the airbag 14 is maintained rolled and/or folded in the stored condition so that the airbag module 20 can be installed in the vehicle 12 as a unit.

In the packaged condition, the rolled/folded condition of the airbag 14 can be maintained by wrapping structures, such as tape, straps, wraps, tethers, or sheaths that are rupturable to release the airbag to deploy in response to inflation. Example wrapping structures 60 are shown in FIG. 1B. Wrapping structures are typically formed separately from the airbag 14 and attached during assembly. In some instances, these separately formed wrapping structures are made from materials that are different than the airbag fabric that forms the airbag. In other instances, the separately formed wrapping structures are made from the same material used to form the airbag. Regardless of the construction, the process for packaging an airbag using the separately formed wrapping structures requires additional steps of manufacturing the separately formed wrapping structures and attaching the separately formed wrapping structures to, or installing the separately formed wrapping structures on, the rolled and/or folded airbag.

Figure 2:
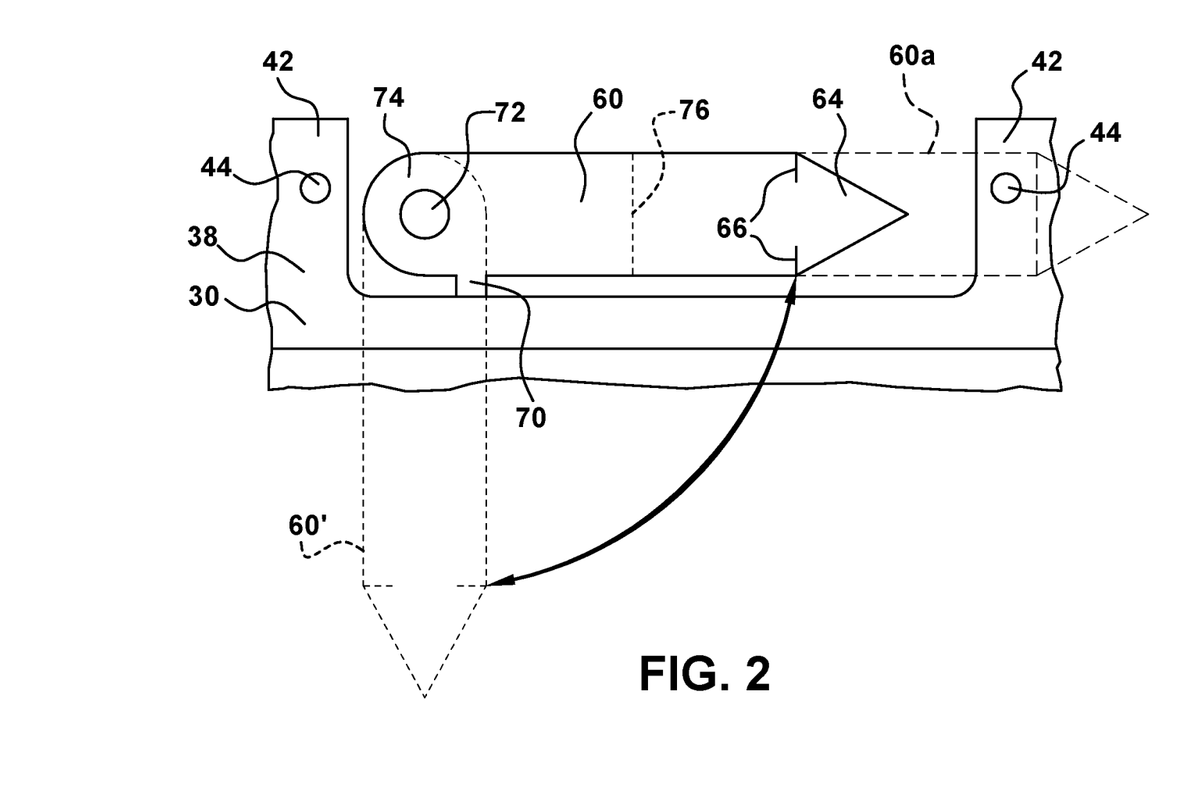
FIG. 2 is a magnified schematic view of a portion of a curtain airbag illustrating an issue that can be encountered in its configuration/construction.

To help reduce the use of additional material and the manufacturing steps required to package the airbag 14, the wrapping structures 60 can be formed as an integral portion of the airbag. This is shown in FIG. 2. As shown in FIG. 2, the wrapping structure 60 can be formed along the upper edge 38 of the airbag 14, along the peripheral connection 30, e.g., between mounting tabs 42. The wrapping structure 60 can include an elongated body 62 with a pointed retention tip 64 with retention slits 66 formed adjacent the tip. A small tab 70 can connect the body 62 to the peripheral connection 30 of the airbag 14, which allows for manipulating the position of the wrapping structure relative to the remainder of the airbag 14.

As indicated generally by the arrow A in FIG. 2, the wrapping structure 60 can be manipulated from the as-manufactured position shown in solid lines to the position shown in dashed lines at 60'. In this position, the wrapping structure can be wrapped around the rolled/folded airbag 14, and the retention tip 64 can be maneuvered through a hole 72 formed in a tail portion 74 of the wrapping structure. Pulling the retention tip 64 through the hole 72, portions of the tail 74 adjacent the hole can enter the retention slits 66 adjacent the retention tip. The engagement between the retention slits 66 and the tail portion 74 retains the wrapping structure 60 and maintains the packaged condition of the airbag 14. This retention can be overcome by deployment forces when the airbag 14 is inflated, thus releasing the airbag to inflate and deploy. To help ensure a repeatable and reliable release, the wrapping structure 60 can include tear stitching 76.

FIG. 2 also illustrates that the length of the wrapping structure 60 can be limited by the configuration of the airbag 14. Specifically, as shown in dashed lines at 60*a*, the desired length of the wrapping structure 60 can be longer than the spacing of the adjacent structures, i.e., the mounting tabs 42, permit. In this instance, the incorporation of the wrapping structure might not be possible, necessitating the use of wrapping structures separate from the airbag 14 and the undesirable costs associated therewith.

Accordingly, there exists a need to extend the length of integrated wrapping structures and, for that matter, any other structure that is integral to an airbag. One problem, however, is that incorporating such structures is limited not only by the configuration of the airbag (e.g., the spacing of the mounting tabs 42, as shown in FIG. 2), but also by the limitations of the manufacturing process itself. Airbags 14 are woven fabric structures and, regardless of their construction, e.g., one piece woven, sewn, etc., there are limitations placed on the bag configuration by the weaving equipment, i.e., looms, that weave fabric airbags or airbag components.

Airbags are mass produced by weaving multiple airbags simultaneously in what is referred to as "loom-state" and subsequently processed, e.g., washed, combed, sealed, laminated, etc., before separating the individual airbags from the loom-state material. The looms used to weave airbags have a maximum width of the fabric structures that can be woven. This width corresponds to the weft direction of the woven fabric. While the length (warp direction) of the fabric structures that can be woven is essentially unlimited, the maximum width is fixed and cannot be increased. Because of this, quite often, airbags are woven in a nested pattern that utilizes a maximal portion of the width of the loom so that a maximum number of airbags can be produced in the loom-state with as little material waste as possible. Doing this positions the airbags close to each other in the loom-state. After processing, the airbags are subsequently separated, i.e., cut out, using various techniques, such as laser cutting. Because of the limited loom width and close spacing of the nested airbag structures in the loom-state manufacture, often there is little room for extending the dimensions of peripheral airbag portions, such as wrapping structures or mounting tabs, away from the periphery of the airbag, especially in the widthwise/weft direction of the nested pattern.

Accordingly, the airbag 14 includes extendable members that extend the dimensions of the as-woven structure. In some instances, the extendable members are configured to extend beyond the periphery of the as-woven structure. In other configurations, the extendable members can extend the as-woven structure within its periphery. These extendable members can, for example, form mounting tabs, wrapping structures, or any other structure where there is a need or desire to extend the length or reach of the as-woven structure. While the extendable members are described herein as portions of the airbag 14, the extendable members can be applied to any woven airbag structure.

Figure 3:
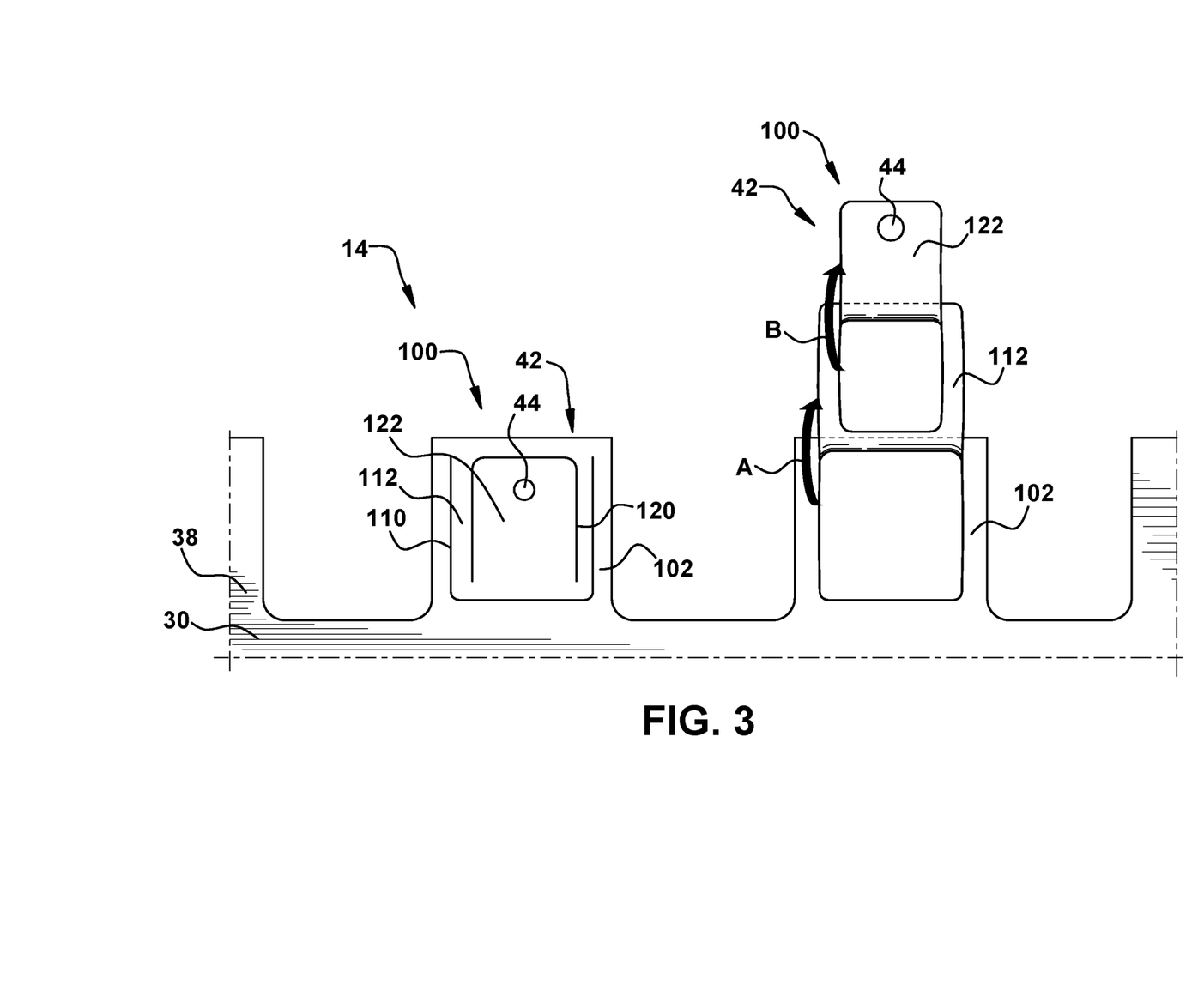
FIG. 3 is a magnified schematic view of a portion of a curtain airbag illustrating an extendable members in both a non-extended and extended condition, according to a first example configuration.

FIG. 3 illustrates an example configuration of the airbag 14 outfitted with two extendable members 100—one that is not extended (on the left) and one that is extended (on the right). In the example configuration of FIG. 3, the extendable members 100 form mounting tabs 42 for the airbag 14. As such, the extendable members 100/mounting tabs 42 are formed in the periphery 30 of the airbag 14 along the upper edge 38, and are therefore formed in a single layer portion of the OPW airbag 14.

The extendable members 100 are defined by openings that are cut through the airbag fabric, for example, via laser cutting. In this description, the openings are described as slits formed by a single slice or cut through the airbag fabric. The openings could, however, have any form, such as slots in which material is removed to form the opening. Throughout this description, the term "slit" or "slits" is used, with the understanding that other types of openings can be implemented.

As shown in FIG. 3, each extendable member 100 includes a first, outer slit 110 and a second, inner slit 120. Each slit 110, 120 has a concave shape, with the second slit 120 being nested within the first slit 110 and inverted with respect to the first slit. The first slit 110 defines a first portion 112 of the extendable member 100. The second slit 120 defines a second portion 122 of the extendable member 100, nested within the first portion 112. Both the first and second portions 112, 122 are nested within a base portion 102 of the extendable member 100.

Due to the concave configurations of the first and second slits 110, 120, the first and second portions 112, 122 can be folded or otherwise flipped relative to the respective portions within which they are nested, away from the periphery 30 of the airbag 14. More specifically, as shown on the right side of FIG. 3, the first portion 112 can be flipped relative to the base portion 102, as indicated generally by the arrow A in FIG. 3. The first portion 112, when flipped, takes the second portion 122 with it. When the first portion 112 is flipped, the second portion 122 becomes inverted from the position shown to the left in FIG. 3. The second portion 122 is then flipped, as indicated generally by the arrow B, thus placing the extendable member 100 in the fully extended condition illustrated to the right in FIG. 3.

It can therefore be seen that the mounting tab 42 can be made extendable through the use of the extendable member 100. As a result, the position of the mounting aperture 44 can be extended beyond the periphery of airbag as cut from the loom-state manufacture. The extendable mounting tab 42 can therefore accommodate the mounting location in the vehicle without necessitating a change to the nesting configuration of the loom-state manufacture. This helps avoid compromising the material efficiencies realized through nesting of the airbags 14 in the loom-state, which would occur if the weave configuration was altered to extend the periphery of the airbags.

As an additional advantage, configuring the mounting tab 42 to include the extendable member 100 does not require any change to the woven structure. The formation of the extendable member can be achieved through cutting of the first and second slits 110, 120, e.g., via laser or die cutting. In either instance, it is not necessary to adjust the weave. Forming the extendable member 100 without changes to the weave configuration is a possibility and not a requirement. Configuring the extendable member 100 in combination with configuration changes to the mounting tab 42 can also be done to meet the requirements of particular airbag/vehicle architecture. For example, the dimensions of the portion of the fabric structure in which the extendable member 100 is formed can be adjusted so as to facilitate the slit formations necessary to provide the required configuration/dimensions of the mounting tab 42 when extended.

Figure 4:
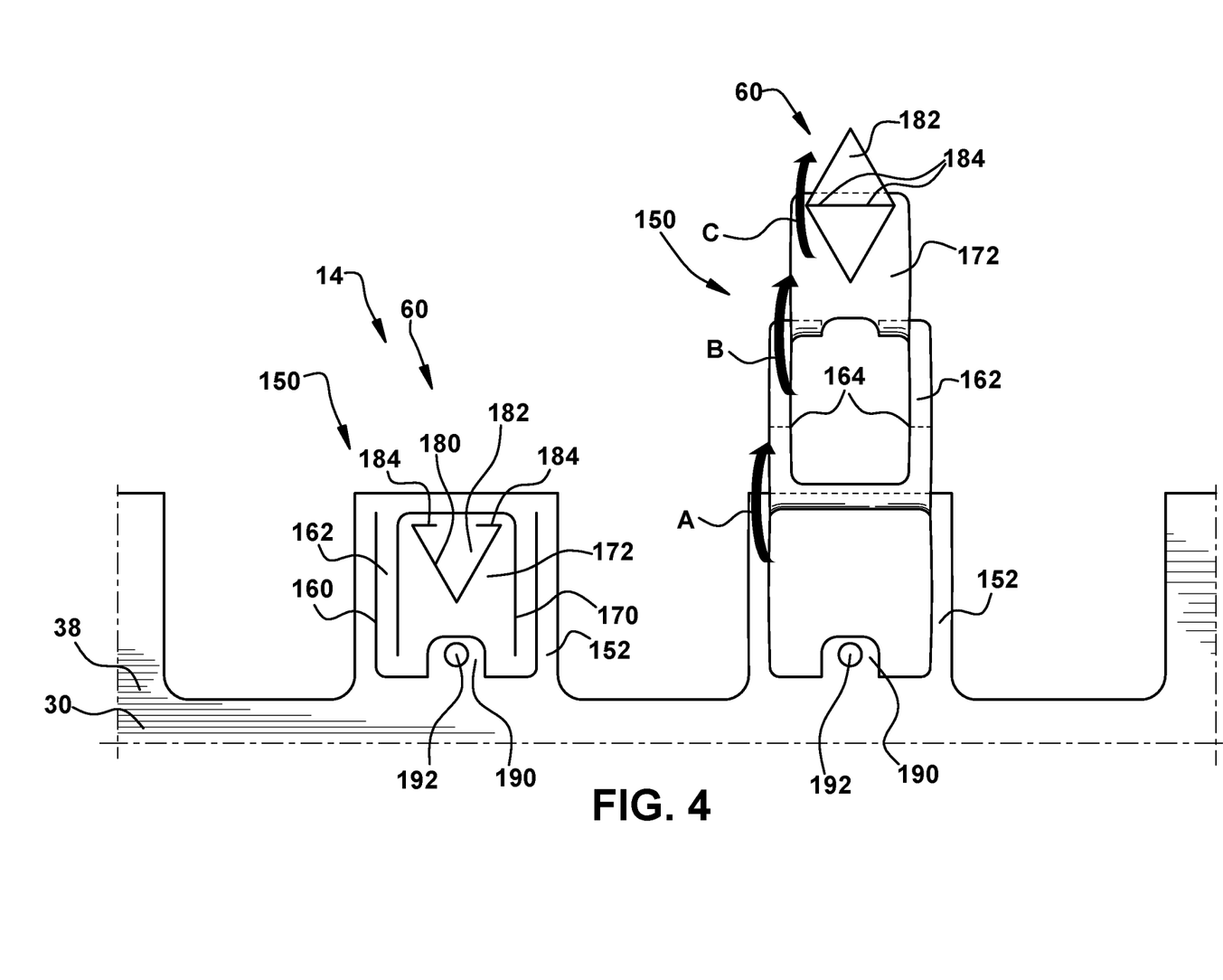
FIG. 4 is a magnified schematic view of a portion of a curtain airbag illustrating an extendable members in both a non-extended and extended condition, according to another example configuration.

The features of an extendable member can also be applied to a wrapping structure for holding/maintaining the airbag in a packaged condition. This is shown in FIG. 4, which illustrates an example configuration of the airbag 14 outfitted with two extendable members 150. As shown in FIG. 4, one extendable member 150 is not extended (on the left) and one wrapping structure is extended (on the right). In the example configuration of FIG. 4, the extendable members 150 form wrapping structures 60 for the airbag 14. As such, the extendable members 150/wrapping structures 60 are formed in the periphery 30 of the airbag 14 along the upper edge 38, and are therefore formed in a single layer portion of the OPW airbag 14.

The extendable members 150 are defined by slits that are cut through the airbag fabric, for example, via laser cutting. As shown in FIG. 4, each extendable member 150 includes a first, outer slit 160 a second slit 170 nested within the first slit, and an third slit 180 nested within the second slit. Each slit 160, 170, 180 has a concave shape. The second slit 170 is nested within the first slit 160 and inverted with respect to the first slit. The third slit 180 is nested within the second slit 170 and inverted with respect to the second slit.

The first slit 160 defines a first portion 162 of the extendable member 150. The second slit 170 defines a second portion 172 of the extendable member 150, nested within the first portion 162. The third slit 180 defines a third portion 182 of the extendable member 150, nested within the second portion 172. The first, second, and third portions 162, 172, 182 are nested within a base portion 152 of the extendable member 150.

Due to the concave configurations of the first, second, and third slits 160, 170, 180, the first, second, and third portions 162, 172, 182 can be folded or otherwise flipped relative to the respective portions within they are nested, away from the periphery 30 of the airbag 14. More specifically, as shown on the right side of FIG. 4, the first portion 162 can be flipped relative to the base portion 152, as indicated generally by the arrow A in FIG. 4. The first portion 162, when flipped, takes the second and third portions 172, 182 with it. When the first portion 162 is flipped, the second and third portions 172, 182 become inverted from the position shown to the left in FIG. 4. The second portion 172 is then flipped relative to the first portion 162, as indicated generally by the arrow B in FIG. 4. The second portion 172, when flipped, takes the third portion 182 with it, and inverts it again. The third portion 182 is then flipped relative to the second portion 172, as indicated generally by the arrow C in FIG. 4, placing the third portion in the upward pointing configuration shown in FIG. 4.

The extendable member 150 extends or elongates the wrapping structure 60, giving it the length necessary to wrap around and package the rolled/folded airbag 14. To facilitate the connection necessary to retain the wrapping structure 60, the third slit 180 includes inward extending portions 184 that define retention slits of a retention tip defined by the third portion 182. The first slit 160 defines a retention tab 190 including a hole 192 for receiving the retention tip 182. The retention tip 182 can be manipulated (e.g., rolled, folded, etc.) and passed through the retention hole 192 so that portions of the retention tab 190 along the periphery of the retention hole enter the retention slits 184.

It can therefore be seen that the wrapping structure 60 can be made extendable through the use of the extendable member 150. As a result, the wrapping structure 60 can be formed at a location on the airbag 14 where it might be impossible to do so with a traditional, non-extendable structure (see, e.g., FIG. 2). This allows the wrapping structure 60 to be extended beyond the periphery of airbag as cut from the loom-state manufacture. The extendable wrapping structure 60 can therefore overcome a lack of peripheral space on the periphery 30 of the airbag 14, allowing for its inclusion where mounting location in the vehicle without necessitating a change to the nesting configuration of the loom-state manufacture. This helps avoid compromising the material efficiencies realized through nesting of the airbags 14 in the loom-state, which would occur if the weave configuration was altered to extend the periphery of the airbags.

As an additional advantage, configuring the wrapping structure 60 to include the extendable member 150 does not require any change to the woven structure of the airbag 14. The formation of the extendable member 150 can be achieved through cutting of the slits 160, 170, 180, e.g., via laser or die cutting. In either instance, it is not necessary to adjust the woven configuration of the airbag itself. Forming the extendable member 150 without changes to the weave configuration is a possibility and not a requirement. Configuring the extendable member 150 in combination with configuration changes to the wrapping structure 60 can also be done to meet the requirements of particular airbag/vehicle architecture. For example, the dimensions of the portion of the fabric structure in which the extendable member 150 is formed can be adjusted so as to facilitate the slit formations necessary to provide the required configuration/dimensions of the wrapping structure 60 when extended.

Figure 5A:
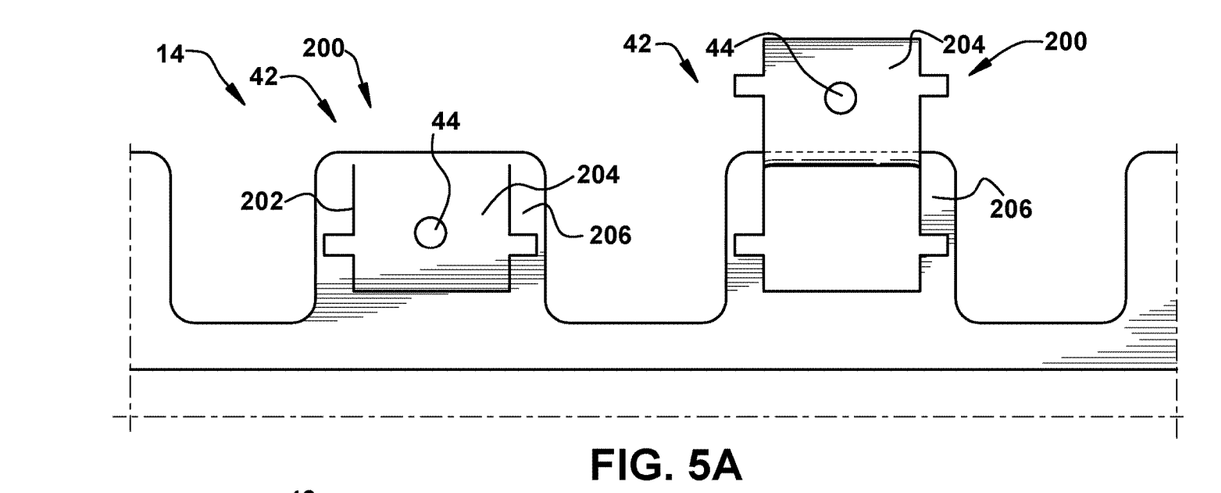
FIG. 5A is a magnified schematic view of a portion of a curtain airbag illustrating an extendable members in both a non-extended and extended condition, according to a another example configuration.
Figure 5B:
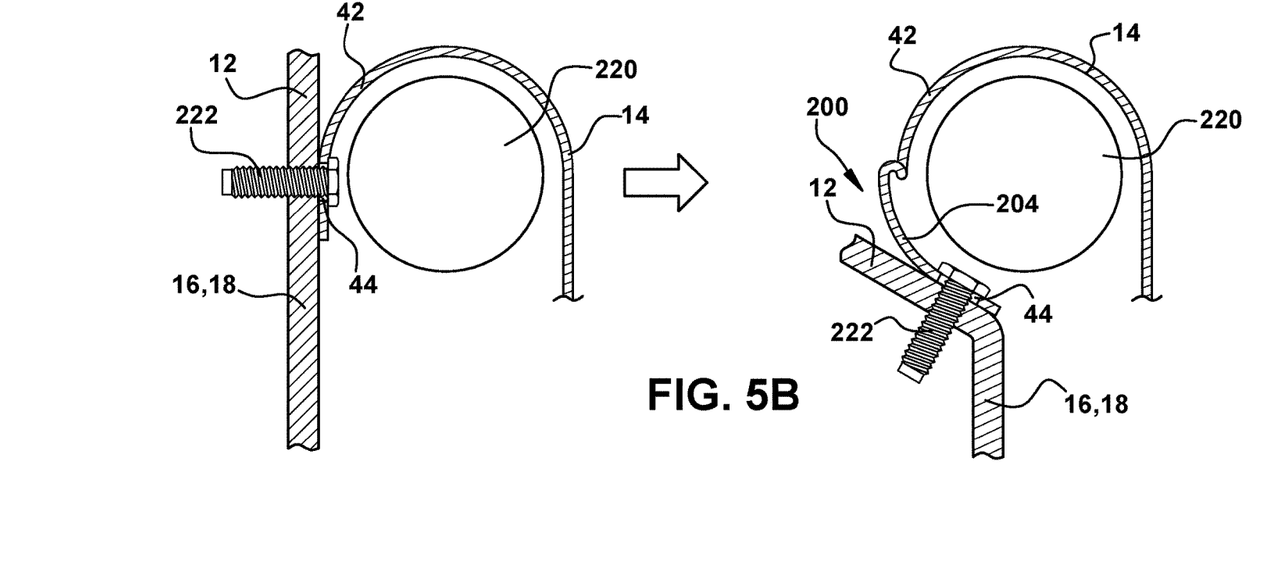
FIG. 5B is a schematic side view illustrating the implementation of the extendable members of FIG. 5A.

One example illustrating the utility of the extendable member is shown in FIGS. 5A and 5B. As shown in FIG. 5A, an airbag 14 is fitted with extendable members 200 that form mounting tabs 42. In this example configuration, the mounting tabs 42 include a single slit 202 that forms a first portion 204 that is nested within, and extendable relative to, a base portion 206. The first portion 204 includes a mounting aperture 44.

As shown in FIG. 5B, the mounting tab 42 can be one that cooperates with an inflator stud 222 that connects an inflator 220 and the airbag 14 to structure of the vehicle 12, such as the side structure 16, roof 18, a seat frame 22, or an instrument panel structure 18. In the case of a seat frame mounting location, the airbag 14 can be a side airbag mounted, for example, to a seatback portion of the seat frame 22. In the case of an instrument panel structure mounting location, the airbag 14 can be a knee airbag or knee bolster mounted, for example, to a portion of the instrument panel structure 24 in the area of a footwell of the vehicle 12.

As shown to the left in FIG. 5B, the vehicle architecture at one mounting location can allow for the use of a traditional, non-extended mounting tab 42. As shown to the right in FIG. 5B, the vehicle architecture at another mounting location can benefit from the use of a mounting tab 42 outfitted with the extendable member 200 by extending the radial reach of the mounting tab. Thus, it will be appreciated that, depending on the vehicle architecture, the airbag 14 can include mounting tabs 42 both with and without extendable members 200.

The implementation of the mounting tab 42 outfitted with the extendable member 200 in the scenarios illustrated in FIGS. 5A and 5B can be especially beneficial in the instance where the airbag 14 is a side airbag or knee airbag and the vehicle structure is the seat frame 22 or instrument panel 24, respectively. Due to the complexities of these mounting locations, the position of the studs 222 and other fasteners can necessitate the extended reach provided by the extendable member 200. Often, however, these types of airbags are better suited for a cut-and-sewn construction, as opposed to an OPW construction, due to their complex structures. Nevertheless, the cut-and-sewn side an/or knee airbags can include the mounting tab 42 outfitted with the extendable member 200 as a sewn-on component of the cut-and-sewn construction. This is shown in FIG. 5C.

Referring to FIG. 5C, the airbag 14 has a cut-and-sewn construction in which the mounting tab 42, including the extendable member 200 is secured to an edge portion of the airbag via stitching 26. The form of the extendable member 200 in FIG. 5C is by of example only. The extendable member 200 can have the form of any of the extendable members described herein.

Figure 6A:
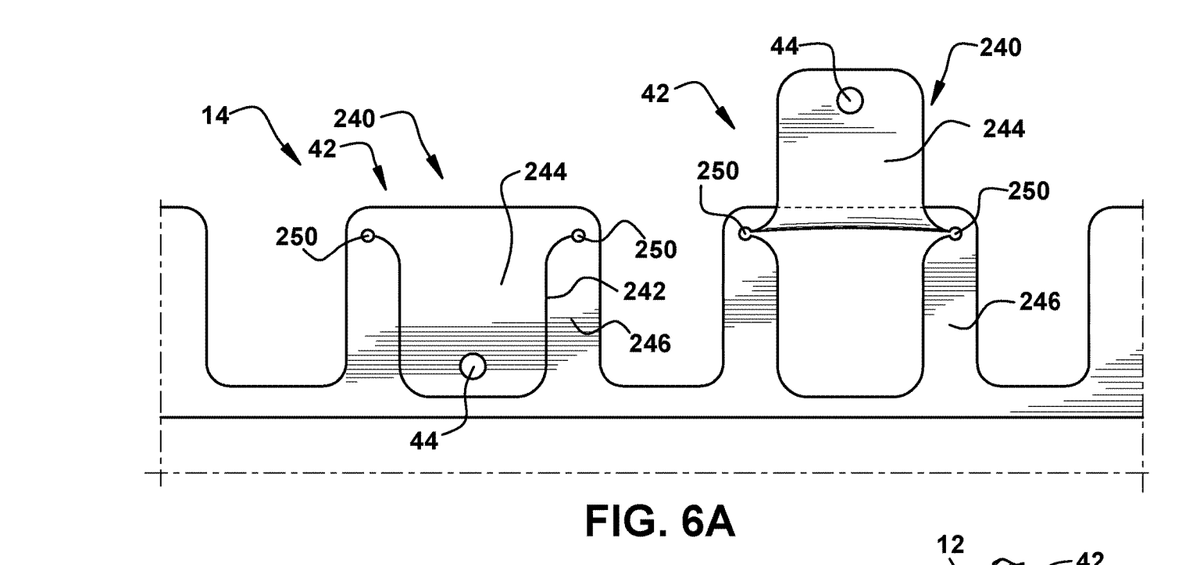
FIG. 6A is a magnified schematic view of a portion of a curtain airbag illustrating an extendable members in both a non-extended and extended condition, according to another example configuration.
Figure 6B:
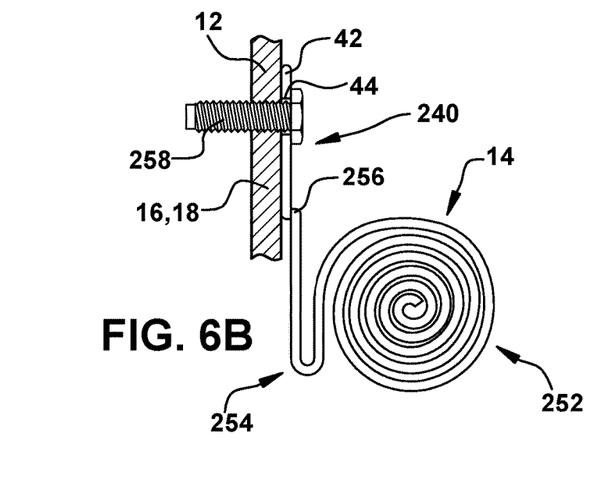
FIG. 6B is a schematic side view illustrating the implementation of the extendable members of FIG. 6A.

Another example illustrating the utility of the extendable member is shown in FIGS. 6A and 6B. As shown in FIG. 6A, an airbag 14 is fitted with extendable members 240 that form mounting tabs 42. In this example configuration, the mounting tabs 42 include a single slit 242 that forms a first portion 244 that is nested within, and extendable relative to, a base portion 246. The first portion 244 includes a mounting aperture 44.

One feature of the example configuration of FIGS. 6A and 6B is the inclusion of stress reducing portions 250 of the slit 242. The stress reducing portions 250 define the opposite ends of the slit 242 and include outwardly curved portions that terminate in a round or circular opening. The stress reducing portions 250 replace the straight line terminations of slits shown in the example configurations of FIGS. 1A-5B. The stress reducing portions shown in FIGS. 6A and 6B can be implemented in any of the configurations disclosed or contemplated herein. The stress reducing portions 250 help to combat stress risers in the mounting tabs 42. Stress risers are portions of the fabric structure in which stress can be concentrated under loading conditions due to the configuration of the slit. By configuring the slit 242 to include the stress reducing portions 250, stress risers at the terminal ends of the slit can be avoided.

FIG. 6B illustrates another instance in which the extendable member 240 can be beneficial. In FIG. 6B, the airbag 14 is a curtain airbag is flip-folded in the packaged condition. "Flip-folding" refers to a stored condition in which the curtain airbag 14 is rolled from the bottom up for the majority of the airbag height and then flipped, i.e., folded, in the opposite direction. When this is done, the rolled and flipped airbag can be positioned adjacent the upper edge 256 of the airbag, making it difficult to install fasteners 258 to secure the airbag to the vehicle 12, e.g., to the side structure 16 and/or roof 18. The inclusion of the extendable members 240 in the mounting tabs 42 extends the reach of the mounting tabs and facilitates installation of the fasteners 258.

Figure 7:
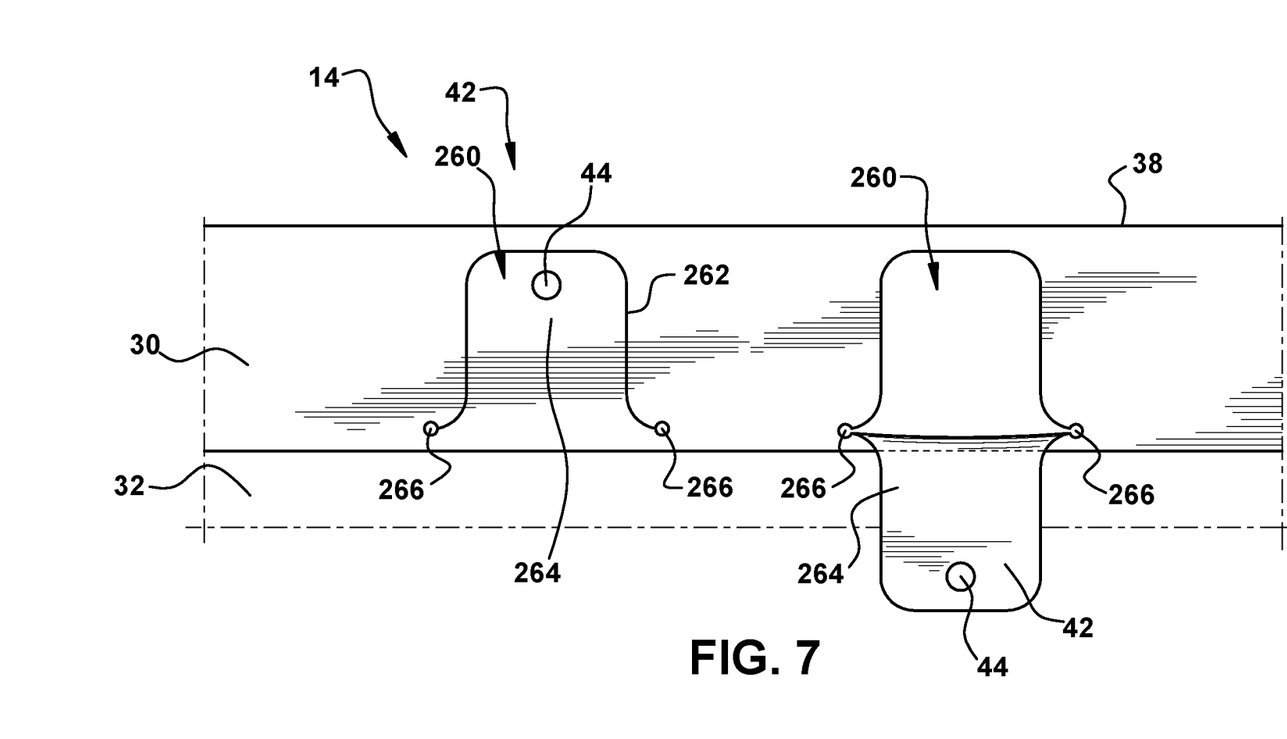
FIG. 7 is a magnified schematic view of a portion of a curtain airbag illustrating an extendable members in both a non-extended and extended condition, according to another example configuration.

Another example illustrating the utility of the extendable member is shown in FIG. 7. As shown in FIG. 7, an airbag 14 is fitted with extendable members 260 that form mounting tabs 42 in the periphery 30 along the upper edge 38 of the airbag. In this example configuration, the mounting tabs 42 include a single slit 262 that forms a first portion 264 that is nested within, and extendable relative to, a base portion 266. The first portion 264 includes a mounting aperture 44. The slit 262 includes stress reducing portions 266.

In the example configuration of FIG. 7, the extendable member 260 is configured to extend the mounting portion 42 downward from the upper edge 38 and the periphery 30. The first portion 264 can, for example, extend the mounting portion 42 downward to overlie the inflatable volume 32 of the airbag 14. This, again, can help facilitate installation of the airbag 14 in a vehicle with an architecture that requires a connection below the upper edge 38 of the airbag.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:
   an airbag inflatable from a stored condition to a deployed condition in which the airbag is positioned to help protect the vehicle occupant, the airbag including an extendable member comprising one or more slits formed in the airbag material, wherein each slit has a concave configuration defining an extendable portion of the extendable member that is movable relative to the remainder of the extendable member to extend the reach of the extendable member.

2. The apparatus recited in claim 1, wherein the extendable member is formed along a periphery of the airbag, and wherein the extendable member is configured so that the extendable portion is configured to be extendable beyond the periphery of the airbag.

3. The apparatus recited in claim 2, wherein the airbag has a one-piece woven fabric construction comprising overlying panels that are interwoven to form single layer portions defining an inflatable volume between the overlying panels, wherein the periphery comprises a single layer portion of the one-piece woven fabric, the one or more slits extending through the single layer portion.

4. The apparatus recited in claim 2, wherein the airbag has multiple components that are interconnected to form the airbag structure, wherein the extendable member forms one of the components and is connected to the periphery of the airbag.

5. The apparatus recited in claim 4, wherein the airbag is a side airbag or a knee airbag, and wherein the extendable member is configured extend the reach of a mounting tab of the airbag so that a remotely located mounting member can be reached.

6. The apparatus recited in claim 1, wherein the extendable member comprises a plurality of nested concave slits defining a plurality of nested extendable portions, wherein each extendable portion is movable relative to an adjacent portion in which it is nested, and wherein each extendable portion, when extended, is configured to increase the reach of the extendable member.

7. The apparatus recited in claim 6, wherein the concave shapes of adjacent ones of the nested slits are inverted relative to each other.

8. The apparatus recited in claim 1, wherein the extendable portions are configured to be folded away from the remainder of the extendable member to extend the reach of the extendable member.

9. The apparatus recited in claim 1, wherein the extendable member comprises a wrapping structure configured to extend around the airbag to maintain the airbag in a packaged condition.

10. The apparatus recited in claim 1, wherein the wrapping structure comprises a retention tip, the retention tip being configured to extend through a retention opening formed in the airbag material to retain the wrapping structure wrapped around the airbag.

11. The apparatus recited in claim 10, wherein the retention tip comprises retention slots configured to receive portions of the airbag material along the periphery of the retention opening to retain the wrapping structure wrapped around the airbag.

12. The apparatus recited in claim 10, wherein the retention opening is formed in a tab defined by the first slit.

13. The apparatus recited in claim 10, wherein the retention tip is configured to release in response to airbag deployment.

14. The apparatus recited in claim 10, wherein the wrapping structure comprises a tear seam.

15. The apparatus recited in claim 10, wherein the airbag is a curtain airbag having a packaged condition configured for installation at or near the intersection of a roof and side structure of the vehicle, wherein the wrapping structure extends around and maintains the curtain airbag in the packaged condition.

16. The apparatus recited in claim 1, wherein the extendable member comprises a mounting tab for mounting the airbag in the vehicle.

17. The apparatus recited in claim 16, wherein the extendable portion comprises a mounting aperture for receiving a fastening structure for securing the airbag to the vehicle, the extendable portion being configured extend the reach of the mounting tab.

18. The apparatus recited in claim 17, wherein the mounting tab is formed along a periphery of the airbag, and wherein the extendable portion of the extendable member is configured to extend the position of the mounting aperture beyond the periphery of the airbag.

19. The apparatus recited in claim 17, wherein the mounting tab is formed along a periphery of the airbag that defines an inflatable volume of the airbag, wherein the extendable portion of the extendable member is configured to extend the position of the mounting aperture to overlie the inflatable volume.

20. The apparatus recited in claim 1, wherein the slits comprise a first slit having a generally U-shaped configuration that defines a first extendable portion, wherein the first extendable portion is movable to extend the reach of the extendable member by folding the first extendable portion along a fold line that extends between ends of the first slit.

21. The apparatus recited in claim 20, wherein the slits comprise a second slit having a generally U-shaped configuration, the second slit being nested within and inverted relative to the first slit, the second slit defining a second extendable portion nested within the first extendable portion, wherein the second extendable portion is movable to extend the first extendable portion to thereby extend the reach of the extendable member by folding the second extendable portion along a fold line that extends between ends of the second slit.

22. The apparatus recited in claim 21, wherein the extendable member comprises a mounting tab for mounting the airbag in the vehicle, wherein the second extendable portion comprises an aperture for receiving a structure for mounting the airbag in the vehicle.

23. The apparatus recited in claim 21, wherein the extendable member comprises a wrapping structure for maintaining the airbag in a packaged condition, wherein the slits comprise a third slit having a shape that forms a retention tip of the wrapping structure, the third slit comprising portions that define retention slits adjacent the retention tip, the retention tip comprising a third extendable portion nested within the second extendable portion, wherein the retention tip is movable to extend the first extendable portion to thereby extend the reach of the extendable member by folding the retention tip along a fold line that extends between the retention slits.

24. An airbag module comprising:
   the apparatus of claim 1; and
   an inflator configured to inflate the airbag.

25. A vehicle safety system comprising:
   the airbag module of claim 24; and
   a controller configured to actuate the inflator in response to detecting the occurrence of a vehicle collision based on signals received from one or more sensors.

26. The apparatus recited in claim 1, wherein the extendable member is configured to help support the airbag in a stored condition in the vehicle.

* * * * *